United States Patent [19]
Hyde

[11] Patent Number: 4,810,736
[45] Date of Patent: Mar. 7, 1989

[54] COMPOSITIONS FOR STABILIZING HALOGEN-CONTAINING ORGANIC POLYMERS

[75] Inventor: Jeffrey R. Hyde, West Chester, Ohio

[73] Assignee: Morton Thiokol, Inc., Chicago, Ill.

[21] Appl. No.: 129,279

[22] Filed: Dec. 7, 1987

[51] Int. Cl.⁴ .............................................. C08K 5/58
[52] U.S. Cl. .............................. 524/181; 252/400.1; 252/402; 524/182; 524/368
[58] Field of Search ............... 524/180, 181, 182, 368; 568/45; 252/400.1, 402

[56] References Cited

U.S. PATENT DOCUMENTS

| | | | |
|---|---|---|---|
| 2,466,963 | 4/1949 | Patrick et al. | 528/374 |
| 3,167,527 | 1/1965 | Hechenkleikner | 524/179 |
| 3,997,614 | 12/1976 | Lenke et al. | 568/45 |
| 4,097,299 | 6/1978 | Bertozzi | 106/287.32 |
| 4,184,890 | 1/1980 | Bertozzi | 106/287.26 |
| 4,593,059 | 6/1986 | Mesch et al. | 524/181 |

Primary Examiner—Veronica P. Hoke
Attorney, Agent, or Firm—Wayne E. Nacker; Gerald K. White

[57] ABSTRACT

Compositions comprising the combination of an organotin mercaptide and a polyformal of a dithiodiglycol are useful for stabilizing halogen-containing organic polymers against the deteriorative effects of heat, light and weathering.

6 Claims, No Drawings

COMPOSITIONS FOR STABILIZING HALOGEN-CONTAINING ORGANIC POLYMERS

BACKGROUND OF THE INVENTION

1. Field of the Invention

This invention relates to stabilizing compositions which are capable of stabilizing rigid (unplasticized) halogen-containing organic polymers against the deteriorative effects of heat, light and weathering. Such stabilizing compositions comprise a mixture of an organotin mercaptide and a costabilizer which is a polyformal of a dithiodiglycol.

2. Description of the Prior Art

It has long been known that halogen-containing organic polymers, such as the commercially important polyvinyl chloride (PVC), are subject to deterioration or degradation when exposed to heat and light. Various chemical compounds and compositions have been developed to stabilize these polymers against such deterioration. For the most part, these stabilizers have been directed toward stabilization against heat, such as that encountered during processing of the polymer and its fabrication into articles. Among these heat stabilizers, some of the most effective have been the organotin mercaptide compounds.

Other organic, non-metallic compounds have also been found to be useful as heat stabilizers for halogen-containing organic polymers and are often employed as costabilizers in combination with the organotin stabilizers. For instance, U.S. Pat. No. 4,593,059 describes costabilizers which are dialkyl esters of unsaturated dicarboxylic acids.

With the increased use of halogen-containing organic polymers for rigid articles which will be exposed to light and weathering for long periods of time, e.g., housing siding and window profiles, it has become increasingly important to develop stabilizers which will not only protect the polymer against the high temperatures encountered during processing and fabrication, but will also protect the polymer against the long-term effects of light and weathering. There remains a need for improved stabilizing compositions for halogen-containing organic polymers.

The present invention is directed to a novel combination of a primary organotin mercaptide stabilizer and a costabilizer which enhances the stability of halogen-containing polymer compositions during and after processing and/or which reduces the amount of the primary stabilizer required and thereby reduces odor and tin content in the resin composition which is formed.

SUMMARY OF THE INVENTION

In accordance with the present invention, there are provided compositions capable of stabilizing halogen-containing organic polymers against the deteriorative effects of heat, light and weathering. Such a composition comprises the product produced by combining:
a. an organotin mercaptide compound or mixture of organotin mercaptide compounds; and
b. in an amount sufficient to synergize the stabilization of the halogen-containing organic polymer, but insufficient to plasticize the polymer, a polyformal of a dithiodiglycol.

There is also provided in accordance with the present invention a composition comprising a halogen-containing organic polymer and, in an amount sufficient to stabilize said polymer against the deteriorative effects of heat, light and weathering, a stabilizer composition comprising the product produced by combining:
a. an organotin mercaptide compound or mixture of organotin mercaptide compounds; and
b. in an amount sufficient to synergize the stabilization of the halogen-containing organic polymer, but insufficient to plasticize said polymer, a polyformal of a dithiodiglycol.

DETAILED DESCRIPTION OF CERTAIN PREFERRED EMBODIMENTS

The halogen-containing organic polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymers or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, chlorinated polyvinyl chloride (CPVC) (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alphachloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

The organotin-sulfur compounds useful in the practice of this invention are organotin mercaptides or mixtures of organotin mercaptides.

The organotin mercaptides useful in this invention are compounds which have at least one tetravalent tin atom which has one or two direct tin to carbon bond(s) and at least one tin-to-sulfur-to-carbon (Sn—S—C)

bond. These organotin mercaptides may be further described by the following general formulas:

 (I)

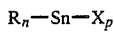 (II)

and

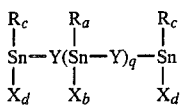 (III)

X is at each independent occurrence selected from

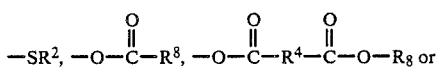

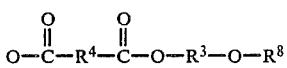

with the proviso that; (1) at least one X in formulas I and II and III is $-SR^2$;

Y is at each independent occurrence selected from

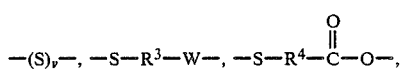

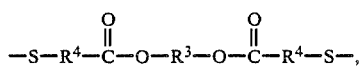

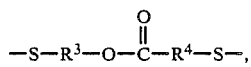

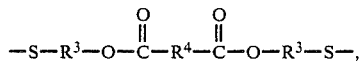

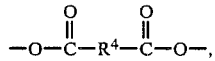

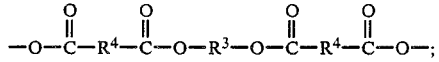

W is at each independent occurrence selected from oxygen or sulfur;

R is at each independent occurrence selected from alkyl, alkenyl, cycloalkyl, cycloalkenyl,

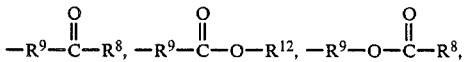

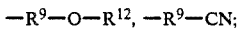

$R^2$ is at each independent occurrence selected from alkyl, alkenyl, cycloalkyl, cycloalkenyl,

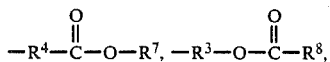

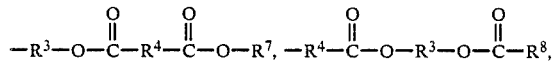

$-R^3-S-R^7$, or $-R^3-O-R^7$;

$R^3$ is at each independent occurrence selected from alkylene of at least 2 carbon atoms, alkenylene of at least 2 carbon atoms, cycloalkylene, or cycloalkenylene;

$R^4$ is at each independent occurrence selected from alkylene, alkenylene, cycloalkylene, or cycloalkenylene;

$R^7$ is at each independent occurrence selected from $-H$ or $R^8$;

$R^8$ is at each independent occurrence selected from alkyl, alkenyl, cycloalkyl, or cycloalkenyl;

$R^9$ is at each independent occurrence selected from $C_1$ to $C_4$ alkylene;

$R^{12}$ is at each independent occurrence selected from $-H$ or a monovalent $C_1$ to $C_{20}$ hydrocarbon radical;

at each independent occurrence $n=1$ or 2 and $p=4-n$;

at each independent occurrence $a=1$ or 2; $b=2-a$; $c=1$ or 2; $d=3-c$; and $q=0$ or an integer from 1 to 10, inclusive; and v is at each independent occurrence selected from an integer from 1 to 8, inclusive.

In the above formulas, it is understood that formula III includes those organotin mercaptides which are cyclic, i.e. where formulas III would be written:

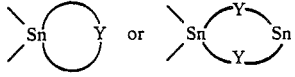

Although formulae I, II and III are inclusive of organotin mercaptides which contain carboxyl groups attached to the tin moieties, preferred organotin mercaptides in accordance with the invention contain the minimum number of such carboxyl groups as determined by the end-use application.

As used in the above formulas and throughout this specification, the term alkyl represents monovalent, straight or branched chain, saturated hydrocarbon radicals containing, for example, 1 to 20 carbon atoms, the term alkylene refers to divalent, straight or branched chain saturated hydrocarbon radicals containing, for example, 1 to 20 carbon atoms and the term alkynylene refers to trivalent straight or branched chain saturated hydrocarbon radicals containing, for example, 1 to 20 carbon atoms. The term alkenyl refers to monovalent, straight or branched chain $C_2$ to $C_{20}$ hydrocarbon radicals containing at least one double bond, and the term alkenylene refers to divalent $C_2$ to $C_{20}$ hydrocarbon radicals containing at least one double bond. The term cycloalkyl represents monovalent $C_3-C_8$ saturated cycloaliphatic radicals; cycloalkylene refers to divalent $C_3-C_8$ cycloaliphatic radicals containing at least one double bond; cycloalkenyl refers to monovalent $C_5-C_8$ cycloaliphatic radicals containing at least one double bond; and cycloalkenylene represents divalent $C_5-C_8$ cycloaliphatic radicals containing at least one double bond.

Examples of organotin mercaptides useful in the practice of this invention include, but are not limited to:

(1) alkyltin alkylthioalkanoates, including monoalkyltin tris(alkylthioalkanoates) and dialkyltin bis(alkylthioalkanoates), such as

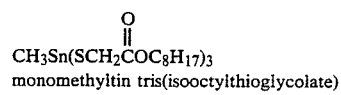
monomethyltin tris(isooctylthioglycolate)

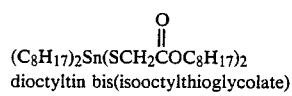
dioctyltin bis(isooctylthioglycolate)

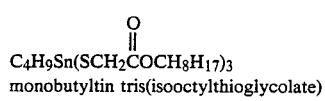
monobutyltin tris(isooctylthioglycolate)

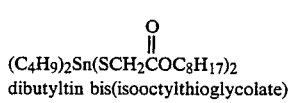
dibutyltin bis(isooctylthioglycolate)

(2) alkyltin mercaptoalkylalkanoates, including the monoalkyltin tris(mercaptoalkylalkanoates) and dialkyltin bis(mercaptoalkylalkanoates), such as

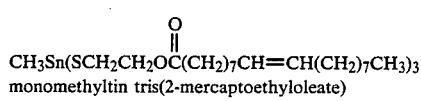
monomethyltin tris(2-mercaptoethyloleate)

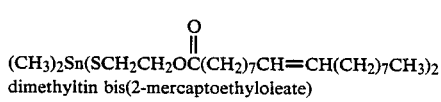
dimethyltin bis(2-mercaptoethyloleate)

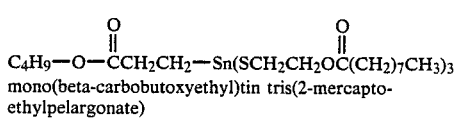
mono(beta-carbobutoxyethyl)tin tris(2-mercaptoethylpelargonate)

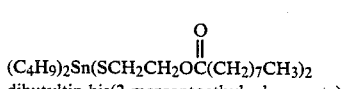
dibutyltin bis(2-mercaptoethylpelargonate)

(3) bis(alkyltin alkylthioalkanoate) sulfides, including the bis(monoalkyltin di(alkylthioalkanoate))sulfides and bis(dialkyltin mono(alkylthioalkanoate))sulfides, such as

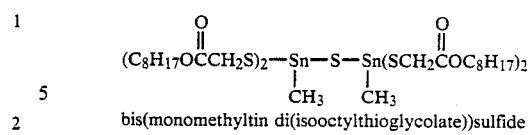
bis(monomethyltin di(isooctylthioglycolate))sulfide

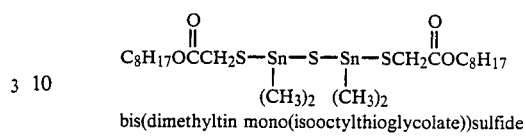
bis(dimethyltin mono(isooctylthioglycolate))sulfide

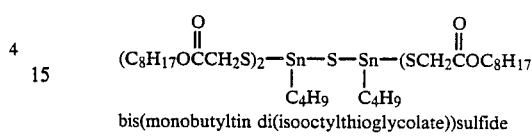
bis(monobutyltin di(isooctylthioglycolate))sulfide

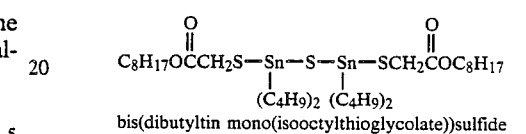
bis(dibutyltin mono(isooctylthioglycolate))sulfide (4) bis(alkyltin mercaptoalkylalkanoate)sulfides, including bis(monoalkyltin di(mercaptoalkylalkanoate))sulfides and bis(dialkyltin mono(mercaptoalkylalkanoate))sulfides, such as

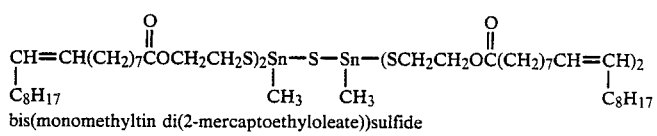
bis(monomethyltin di(2-mercaptoethyloleate))sulfide

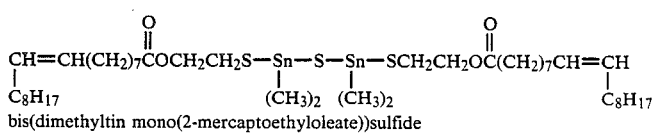
bis(dimethyltin mono(2-mercaptoethyloleate))sulfide

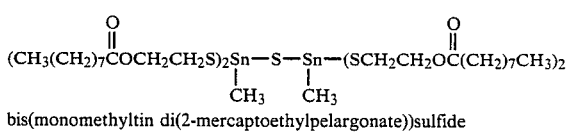
bis(monomethyltin di(2-mercaptoethylpelargonate))sulfide

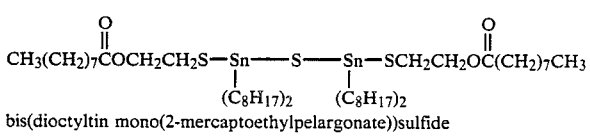
bis(dioctyltin mono(2-mercaptoethylpelargonate))sulfide (5) alkyltin alkylmercaptides, including monalkyltin tris(alkylmercaptides) and dialkyltin bis(alkylmercaptides) such as

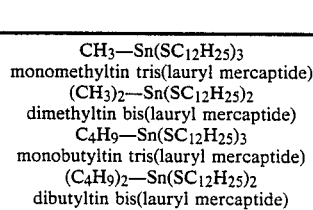

$CH_3-Sn(SC_{12}H_{25})_3$
monomethyltin tris(lauryl mercaptide)
$(CH_3)_2-Sn(SC_{12}H_{25})_2$
dimethyltin bis(lauryl mercaptide)
$C_4H_9-Sn(SC_{12}H_{25})_3$
monobutyltin tris(lauryl mercaptide)
$(C_4H_9)_2-Sn(SC_{12}H_{25})_2$
dibutyltin bis(lauryl mercaptide)

Particularly useful in the practice of this invention are mixtures of monoalkyltin and dialkyltin mercaptides.

The compounds employed as costabilizers in combination with the above-described organotin mercaptide compounds in the practice of this invention are polyformals of dithiodiglycols. These compounds have the general formula:

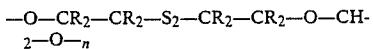
$$-O-CR_2-CR_2-S_2-CR_2-CR_2-O-CH_2-O-_n$$

wherein the R's are the same or different and selected from hydrogen, methyl and ethyl. Preferably, all R's are hydrogen, which polymer is known as ethanol 2-2'-dithiobispolymer with formaldehyde.

That polyformals of dithioglycols are synergists of organomercaptides in stabilizing halogen-containing polymers is suprising and unexpected. Previous experience has taught that sulfides and disulfides have no effect in stabilizing PVC.

Polyformals of dithiodiglycols useful in the present invention have number average molecular weights of between about 350 and about 1600. Formation of these polymers is described in U.S. Pat. Nos. 4,184,890 and 4,097,299, the teachings of which are incorporated herein by reference. As naturally formed, these polymers are hydroxyl-terminated, and are preferably used as such. It is known, however, to alter the terminal groups of such polymers, and the use of such modified polymers are considered to be within the scope of the present invention.

The use of polyformals of dithiodiglycols enhances the stabilizing effect of the organotin mercaptides, particularly with respect to early color. The organotin mercaptide may be used at normal levels along with the costabilizer to provide resin compositions of improved color; alternatively, the use of the costabilizer may be used with a reduced amount of the organotin mercaptide to achieve comparably improved color while minimizing odor in the resin composition which is formed.

The amounts of organotin mercaptide compound and of the costabilizer in the stabilizer compositions of this invention will depend upon several factors, including, but not limited to, the particular organotin mercaptide compound and the particular costabilizer polymer employed, the particular resin which is intended to be stabilized, the severity of the heat, light and weathering to which the resin will be subjected and the degree of stabilization desired. Thus, the amount of organotin mercaptide compound and also of the costabilizer may vary considerably, it being required only that the stabilizer composition contain enough of each component to stabilize a halogen-containing organic polymer against the deteriorative effects of heat, light and weathering.

In general, in stabilizing compositions in accordance with the invention, the costabilizer is used at levels of from about 5.0% to about 50% by weight relative to the organotin mercaptide compound. Preferably the costabilizer is used at levels of from about 10.0% to about 20.0% by weight relative to the organotin mercaptide compound.

As with the relative amounts of organotin mercaptide compound and costabilizer polymer, the amount of stabilizing composition employed in the halogen-containing organic polymer compositions of this invention can vary considerably. The minimum amount of stabilizing composition in the halogen-containing polymer composition is that amount which will stabilize the halogen-containing polymer against the deteriorative effects of heat, light and weathering. While this minimum amount can vary depending upon the same factors referred to above with respect to the stabilizing compositions, in general about 0.1% to about 5.0% of stabilizing composition based upon the weight of halogen-containing organic polymer will be sufficient to impart the desired properties to the halogen-containing polymer composition. Amounts greater than this minimum level of stabilizing compositions can, of course, be employed, although at some point the increase in stabilization of the halogen-containing polymer composition is not commensurate with the additional amount of stabilizing composition employed. Thus, while there is no critical upper limit to the amount of stabilizing composition which may be employed, amounts in excess of about 8% by weight generally do not give an increase in effectiveness which will justify the use of these higher amounts of stabilizing composition.

The stabilizing compositions of this invention can be made quite simply. For example, the organotin mercaptide compounds and costabilizer polymer can be simply combined physically as by mixing, blending, stirring, shaking or the like to form a stabilizing composition. Likewise, the halogen-containing organic polymer compounds of this invention may be prepared by physically blending the stabilizing composition and the polymer in any convenient manner until the stabilizing composition is thoroughly dispersed throughout the polymer compound. Other additives well known in the art, such as plasticizers, fillers, pigments, lubricants, antioxidants, fire retardants, U.V. stabilizers, antistatic agents and cross-linking agents may be employed in the polymer compositions of this invention. In normal commercial practice, this is accomplished by high intensity mixing. The polymer compound can then be fused in a conventional manner with heat and high shear forces, e.g., by extrusion, to form the stabilized polymer composition.

The stabilized polymer compositions of this invention are useful to form a variety of rigid articles of manufacture, e.g., housing siding, window profiles and the like, and are especially useful in those articles which are exposed to light and weathering. A variety of conventional techniques may be employed to shape the polymer composition into the desired article.

The following examples illustrate the present invention. Unless otherwise indicated, all parts and percentages in the examples and throughout this specification are by weight.

EXAMPLE 1

Compositions were formulated containing the following ingredients:

| Formulation | Parts Per Hundred Parts Resin (PHR) |
|---|---|
| GEON 103EP F-76, a PVC resin | 100 |
| OMYA 90T (calcium stearate-coated calcium carbonate) | 3.0 |
| TiO$_2$ | 1.00 |
| XL-165 (a paraffin wax) | 1.20 |
| calcium stearate | 0.60 |
| A-C 629A (oxidized polyethylene) | 0.15 |
| Advastab TM-694 (a 2-mercaptoethyloleate based organotin stabilizer) | 0.40 |

Compositions 1, 2, 3, 4, and 5 contained 0.0, 0.1, 0.2, 0.4 and 1.0 PHR of polyformal dithiodiglycol having a number average molecular weight of 867 grams per mole. The formulations were fused on a dynamic mill

1 with a mill temperature of 390° F. (199° C.), speed 30 RPM forward/40 RPM reverse. Tiles were formed from the compositions at 1 minute intervals. The results are given in the following table in which Hunter Colorimeter values are expressed in Delta E's in reference to a standard white tile.

| Color Value | Sample No. | Mins. | | | | | |
|---|---|---|---|---|---|---|---|
| | | 1 | 2 | 3 | 4 | 5 | 6 |
| Delta E | 1 | 4.09 | 10.66 | 13.28 | 16.19 | 17.97 | 20.02 |
| | 2 | 4.17 | 9.16 | 12.43 | 14.14 | 16.50 | 18.29 |
| | 3 | 3.38 | 7.95 | 11.05 | 13.13 | 15.03 | 17.16 |
| | 4 | 3.17 | 8.18 | 10.50 | 12.25 | 14.38 | 17.05 |
| | 5 | 2.96 | 6.56 | 8.96 | 10.80 | 13.15 | 16.98 |
| | | 7 | 8 | 9 | 10 | 11 | 12 |
| Delta E | 1 | 22.03 | 25.23 | 27.06 | 27.26 | | |
| | 2 | 20.84 | 23.88 | 26.13 | 27.43 | 28.51 | |
| | 3 | 19.45 | 22.22 | 25.07 | 27.21 | 27.72 | 30.34 |
| | 4 | 19.49 | 22.73 | 25.37 | 27.49 | 28.88 | 30.54 |
| | 5 | 19.72 | 22.41 | 25.04 | 27.54 | 29.61 | 32.36 |

EXAMPLE 2

Compositions were formulated containing the following ingredients:

| FORMULATION | PHR |
|---|---|
| GEON 103 EP F-76 | 100 |
| K-120 N (process aid) | 1.5 |
| KM-330 (impact modifier) | 6.0 |
| XL-165 | 1.2 |
| Calcium stearate | 1.75 |
| A-C 629A | 0.2 |
| $TiO_2$ | 1.0 |
| Advastab TM-181 (a thioglycolate-based organotin stabilizer) | 1.5 |

Compositions A, B, C and D contained respectively 0.0, 0.05 and 0.1 PHR of polyformal dithiodiglycol. Dynamic mill stability tests were conducted in accordance with Example 1. The results are as follows:

| Color Value | Sample | Mins. | | | | | | |
|---|---|---|---|---|---|---|---|---|
| | | 2 | 4 | 6 | 8 | 10 | 12 | 14 |
| Delta E | A | 3.7 | 6.0 | 8.0 | 9.4 | 10.9 | 12.3 | 13.7 |
| | B | 3.3 | 5.7 | 7.2 | 8.5 | 9.8 | 11.2 | 13.0 |
| | C | 3.1 | 5.3 | 6.6 | 8.0 | 9.7 | 11.0 | 12.6 |

The results of Examples 1 and 2 demonstrate the synergistic affect of polyformal diglycolate in combination with organotin mercaptides in stabilizing polyvinyl compositions.

While the invention has been described in terms of certain preferred embodiments, modifications obvious to one with ordinary skill in the art may be made without departing from the scope of the present invention.

Various features of the invention are set forth in the following claims.

What is claimed is:

1. A composition capable of stabilizing halogen-containing organic polymers against the deteriorative effects of heat, light and weathering, said stabilizing composition comprising the product produced by combining a mixture:
   a. an organotin mercaptide compound or mixture of organotin mercaptide compounds; and
   b. in an amount sufficient to synergize the stabilization of the halogen-containing organic polymer a hydroxyl-terminated polyformal of a dithiodiglycol having the formula

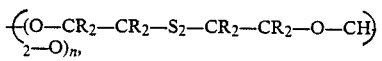

wherein the R's are the same or different and are selected from the group consisting of hydrogen, methyl and ethyl.

2. The composition of claim 1 wherein said organotin mercaptide compound has the formula:

     (I)

or

     (II)

or

     (III)

wherein
X is at each independent occurrence selected from

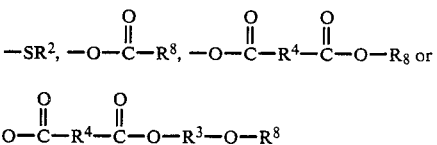

with the proviso that; (1) at least one X in formulas I and II and III is $-SR^2$;
Y is at each independent occurrence selected from

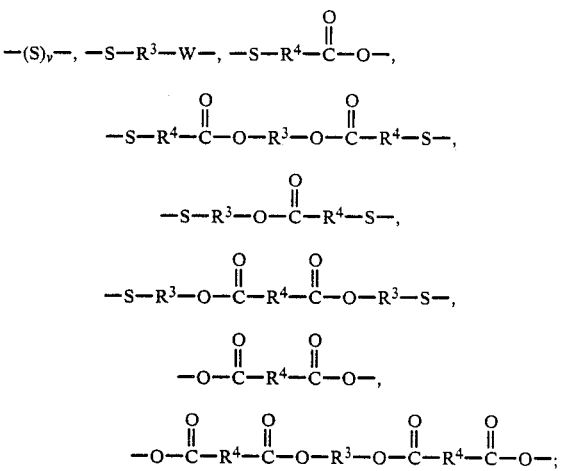

W is at each independent occurrence selected from oxygen or sulfur;
R is at each independent occurrence selected from alkyl, alkenyl, cycloalkyl, cycloalkenyl,

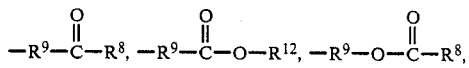

-continued $$-R^9-O-R^{12}, -R^9-CN;$$

$R^2$ is at each independent occurrence selected from alkyl, alkenyl, cycloalkyl, cycloalkenyl, $$-R^4-\overset{O}{\underset{\|}{C}}-O-R^7, -R^3-O-\overset{O}{\underset{\|}{C}}-R^8,$$

$$-R^3-O-\overset{O}{\underset{\|}{C}}-R^4-\overset{O}{\underset{\|}{C}}-O-R^7, -R^4-\overset{O}{\underset{\|}{C}}-O-R^3-O-\overset{O}{\underset{\|}{C}}-R^8,$$

$$-R^3-S-R^7, \text{ or } -R^3-O-R^7;$$

$R^3$ is at each independent occurrence selected from alkylene of at least 2 carbon atoms, alkenylene of at least 2 carbon atoms, cycloalkylene, or cycloalkenylene;

$R^4$ is at each independent occurrence selected from alkylene, alkenylene, cycloalkylene, or cycloalkenylene;

$R^7$ is at each independent occurrence selected from —H or $R^8$;

$R^8$ is at each independent occurrence selected from alkyl, alkenyl, cycloalkyl, or cycloalkenyl;

$R^9$ is at each independent occurrence selected from $C_1$ to $C_4$ alkylene;

$R^{12}$ is at each independent occurrence selected from —H or a monovalent $C_1$ to $C_{20}$ hydrocarbon radical;

at each independent occurrence n=1 or 2 and p=4-n;

at each independent occurrence a=1 or 2; b=2-a; c=1 or 2; d=3-c; and q=0 or an integer from 1 to 10, inclusive; and v is at each independent occurrence selected from an integer from 1 to 8, inclusive.

3. The compositoon of claim 1 wherein polyformal of dithiodiglycol has a number average molecular weight of between about 350 and about 1600.

4. The composition in accordance with claim 1 wherein said polyformal of a dithiodiglycol comprises between about 5.0% and about 50% by weight relative to said organotin mercaptide compound.

5. A polymeric composition comprising a halogenated polyolefin or vinyl or vinylidene halide resin and, in an amount sufficient to stabilize said polymer against the deteriorative effects of heat, light and weathering, a stabilizing composition according to claim 1.

6. A polymeric composition according to claim 5 containing between about 0.1 and about 8.0% of said stabilizing composition relative to the weight of the said polymer.

* * * * *